United States Patent [19]

Burrowes

[11] Patent Number: 4,620,219
[45] Date of Patent: Oct. 28, 1986

[54] APPARATUS FOR DETECTING A CHROMINANCE REFERENCE BURST COMPONENT TO DEVELOP A BURST GATE PULSE

[75] Inventor: Sherwin D. D. Burrowes, East Windsor, N.J.

[73] Assignee: RCA Corporation, Princeton, N.J.

[21] Appl. No.: 637,769

[22] Filed: Aug. 6, 1984

[51] Int. Cl.$^4$ .................................. H04N 9/455
[52] U.S. Cl. ............................................ 358/20
[58] Field of Search .......................... 358/19, 20

[56] References Cited

U.S. PATENT DOCUMENTS

| 4,024,571 | 5/1977 | Dischert et al. | 358/4 |
| 4,316,214 | 2/1982 | Yost | 358/21 |
| 4,339,770 | 7/1982 | Dennison et al. | 358/19 |

FOREIGN PATENT DOCUMENTS 23633  2/1980  Japan .................... 358/19

OTHER PUBLICATIONS

Isao Nakagawa et al., "New Chrominance Signal Processing LSI for Home VCR", IEEE Trans. Con. Elec., vol. CE-26, 8/80, pp. 315-322.

Primary Examiner—John W. Shepperd
Attorney, Agent, or Firm—E. M. Whitacre; P. J. Rasmussen; E. P. Herrmann

[57] ABSTRACT

Apparatus for generating a burst gate pulse from composite video includes a threshold detector for generating output pulses on consecutive positive and negative going burst signal cycles. Output signal from the threshold detector is applied to a digital correlator which generates a control signal when a predetermined signal sequence is produced by the detector. The control signal energizes a counter to count clock pulses synchronized with the burst signal to generate a burst gate pulse have a width equal to a predetermined number of burst signal cycle periods.

15 Claims, 4 Drawing Figures

APPARATUS FOR DETECTING A CHROMINANCE REFERENCE BURST COMPONENT TO DEVELOP A BURST GATE PULSE

BACKGROUND OF THE INVENTION

The present invention relates to video signal processing and more particularly to apparatus for deriving a burst gate signal from composite video signal.

The burst gate signal is nominally a gating signal which occurs during all or a part of the chrominance reference burst interval on each horizontal line of video signal.

Burst gate signals are employed in e.g. color television receivers, for deriving automatic chrominance control signals, reference frequency signals or clock signals, phase locked to the burst component of the composite video signal, etc.

In the NTSC composite video signal the burst signal consists of 8 to 12 cycles of 3.58 MHz signal located on the "back porch" of the horizontal synchronization pulse. The beginning of the burst interval is located 0.38 microseconds or more from the trailing edge of the horizontal synchronization pulse. Conventional methods for generating a burst gate pulse involve timing an interval from either the leading or trailing edge of the horizontal synchronization pulse and at the end of the interval enabling a pulse generator such as a one-shot multivibrator. Such systems produce burst gate pulses that are always substantially equidistant from the horizontal synchronization pulse. However, burst signals on video signals from different channels or from non-standard sources such as video tape recorders are not necessarily equidistant from the horizontal synchronization pulse. In a particular receiver the burst gate pulse may, therefore, not frame like intervals of the burst signal from different channels which may result in non-uniform system performance from channel-to-channel.

It is an object of the present invention to generate burst gate pulses that will occur during like portions of the burst interval regardless of the source of video signal.

SUMMARY OF THE INVENTION

The present invention is a burst gate signal generator including a detector responsive to the burst component of composite video for detecting the occurrence of the burst signal and generating a control signal which occurs after a predetermined number of the firstmost cycles of the burst signal. Counter circuitry is enabled by the control signal to count pulses of a signal, frequency locked with the burst signal component, to produce the burst gate signal having a duration equal to a predetermined number of burst signal cycles.

DETAILED DESCRIPTION

Figure 1:
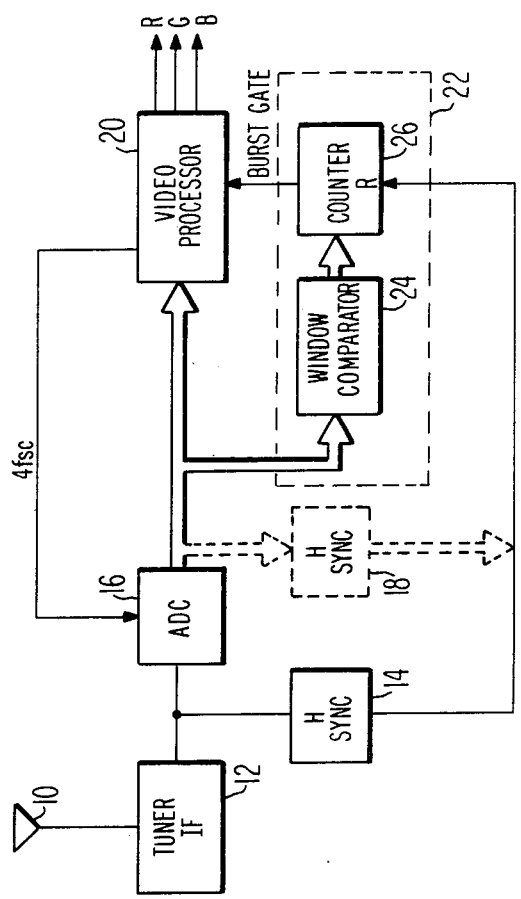
FIG. 1 is a block diagram of a video signal processing system embodying the present invention.

The present invention will be described in terms of a digital video signal processing environment but the concepts are equally applicable to the processing of analog video signals. In the drawing, wide arrows connecting elements are busses for parallel multi-bit digital signals and narrow arrows are connections for single bit digital signals or for analog signals.

The apparatus described herein generates a burst gate pulse from the burst signal itself. Thus, the leading edge of the pulse nominally occurs somewhere within the burst interval. However, the leading edge of the burst gate pulse can be translated, if desired, to the beginning of the burst interval by appropriately delaying the composite video signal to the apparatus which ultimately uses the pulse.

For generating clock signals which are phase locked to burst or ACC signals, for example, it is not necessary that the burst gate pulse encompass the entire burst interval. In fact, it is undesirable to do so because the leading and trailing cycles of burst tend not to exhibit the steady state amplitude of the burst signal. More uniform system performance is obtained if the burst gate pulse encompasses only cycles of the burst signal which have attained the steady state amplitude e.g. cycles 3–6.

Referring to FIG. 1, a portion of an exemplary digital television receiver is shown. Broadcast video signal is received by antenna 10 and applied to a conventional analog tuner-IF section 12. Tuner-IF section 12 produces baseband composite video signal which is applied to the analog input terminal of analog-to-digital converter (ADC) 16. ADC 16 responsive to a clock signal ($4f_{sc}$) having a frequency of four times the subcarrier frequency and phase locked thereto develops digital representations of the analog composite signal. The digital representations or samples occur at the four times subcarrier rate and are applied to video signal processor 20. Video processor 20 includes circuitry to produce R, G, B signals from the composite signal as well as the system clock signal $4f_{sc}$. Such circuitry is known in the art and is not part of the present invention and, thus, will not be discussed further other than to say it requires a burst gate signal to perform part of its functions.

Digital samples from ADC 16 are applied to burst gate generator 22 which includes a window comparator or threshold detector 24 and a counter circuit 26. The counter circuit 26 has a reset terminal to which horizontal synchronization (sync) pulses are applied from element 14. Responsive to the horizontal sync pulses counter circuit 26 is reset at the beginning of each horizontal line of video signal.

Comparator 24 generates a pulse or high logic state for digital samples that exceed a predetermined range of values. The range of values is selected so that the burst signal samples will trigger the comparator and provide a degree of noise immunity. Counter circuit 26 counts the pulses from comparator 24 and, upon receiving a predetermined number of pulses, indicative of the occurrance of e.g. the first three cycles at the burst signal, produces a burst gate pulse having a predetermined width. Ostensibly, since burst is the first signal component to occur after horizontal sync, it will be the burst signal which causes circuit 22 to produce its output, i.e. the burst gate signal. The horizontal sync generating circuit 14 may be a conventional analog sync separation circuit responsive to baseband composite signal from tuner-IF section 12. Alternatively it may be a digital sync separator 18 responsive to digital sample from ADC 16.

Figure 2:
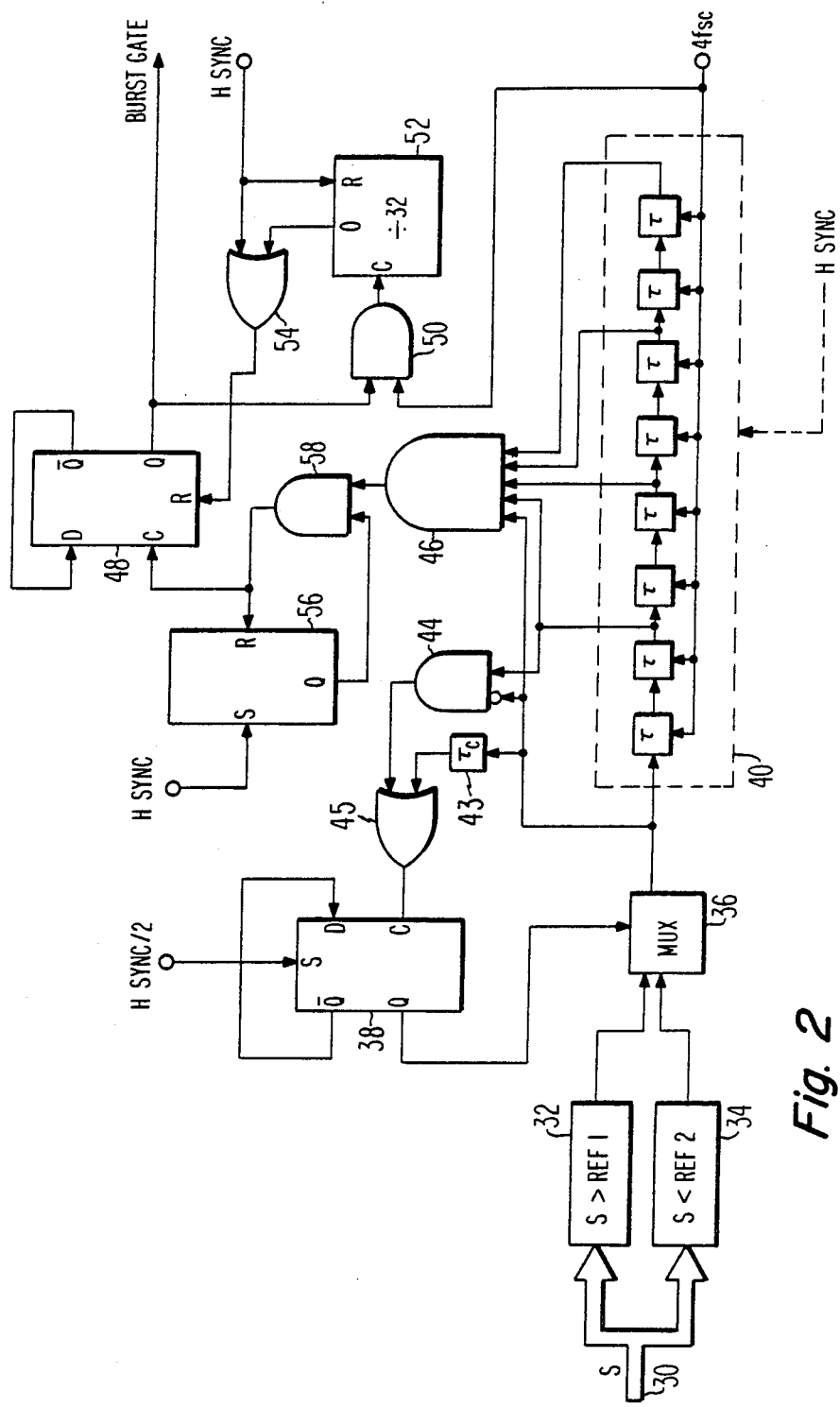
FIG. 2 is a block diagram of the burst gate signal generating apparatus.

FIG. 2 shows in detail an exemplary circuit which may be substituted for the burst gate pulse generator 22 in FIG. 1. This circuitry is designed to provide additional noise immunity to prevent a false or improperly timed burst gate pulse. This will be more readily understood with reference to FIG. 3.

Figure 3:
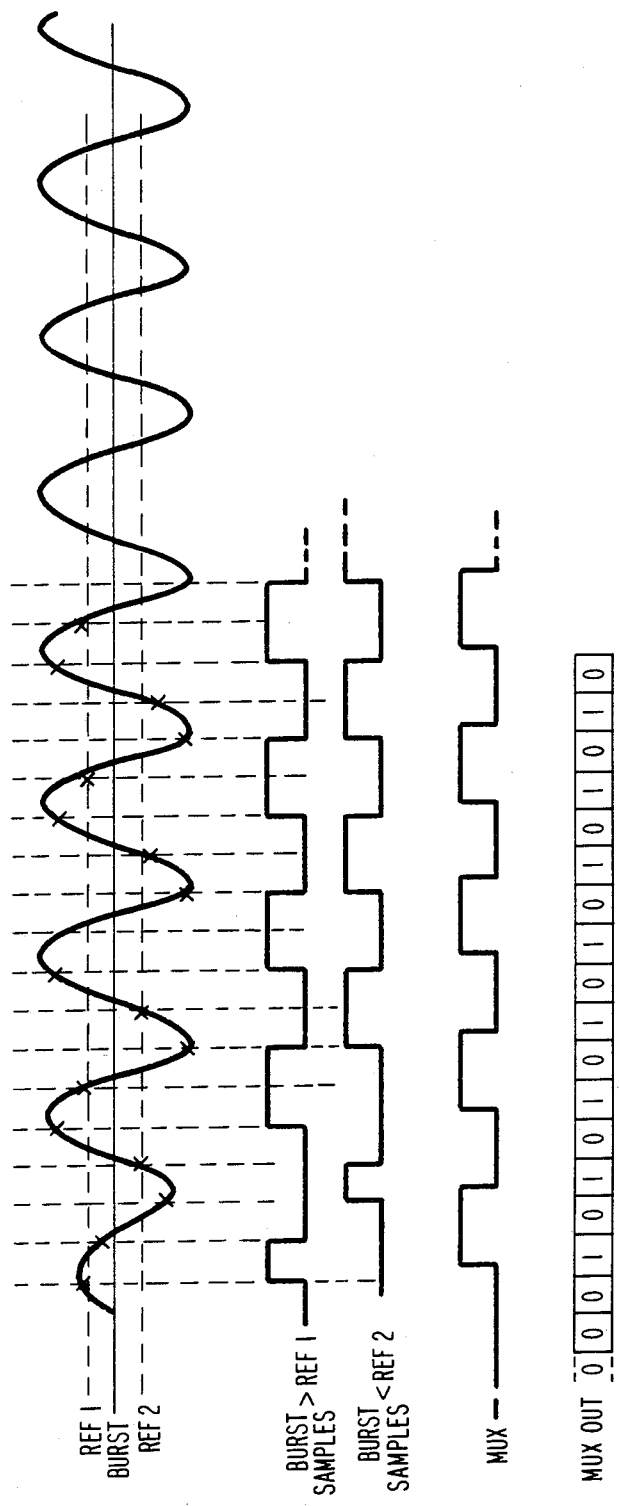
FIG. 3 is a drawing of waveforms useful in explaining the operation of the FIG. 2 circuitry.

In FIG. 3 the uppermost waveform is an amplitude-time diagram of a portion of the burst signal. The small x's on the waveform indicate the times at which the ADC 16 samples the waveform. The digital samples produced by ADC 16 will have values representative of the amplitude at the respective sampling times. The sampling points are separated by 90 degrees relative to the color burst waveform. The relative sampling phase, however, was selected arbitrarily.

The burst signal is a sinusoid and, thus, has an amplitude excusion which extends equidistantly about a mean value. The burst signal has a 180 degree phase relationship from horizontal line to horizontal line.

To ensure that the burst gate pulse generating circuitry is responsive to the burst signal and not noise on the signal, the burst cycle counting circuitry will desirably correlate to the burst frequency. This is accomplished by arranging the circuitry to detect alternating positive and negative going excursions of each burst cycle interval. The threshold detector or comparator must therefore have both relatively positive and relatively negative threshold values. These are indicated in FIG. 3 as the levels Ref 1 and Ref 2 respectively. The threshold detector is designed to output a logic high whenever the burst signal exceeds Ref 1 or is less than Ref 2. Detectors of this type are typically termed window comparators.

In FIG. 2 the threshold detector consists of parallel connected elements 32 and 34. Composite video signal samples, S, are applied to elements 32 and 34 via bus 30. Element 32 produces an output pulse when the samples S exceed Ref 1 and element 34 produces an output pulse when the samples S are less than Ref 2. The output pulses from element 32 and 34 responsive to the FIG. 3 burst signal waveform are illustrated by the Burst >Ref 1 and Burst <Ref 2 waveforms respectively in FIG. 3.

The output pulses from elements 32 and 34 are applied to two signal input terminals of a muliplexer 36. Multiplexer 36 is controlled by "D" type latch 38 connected as a divide by two circuit responsive to the output signal from multiplexer 36. The output pulses from multiplexer 36 are coupled to latch 38 via OR gate 45 and a delay element 43. Delay element 38 is inserted to provide sufficient time for the pulses from multiplexer 36 to be loaded into the tapped delay line 40 before latch 38 conditions multiplexer 36 to change input state. In this arrangement each time multiplexer 36 passes an output pulse latch 38 causes it to switch to pass signal from its alternate input terminal. For example, if multiplexer 36 passes a pulse from element 32 to its output terminal, the next subsequent pulse passed by multiplexer 36 must originate from element 34. The multiplexer control signal for the output waveforms of elements 32, 34 illustrated in FIGURE 3 is the waveform designated Mux in FIG. 3. Finally, the multiplexer 36 output logic states are shown and designated "Mux Out" in FIG. 3. Each box illustrated in the Mux Out signal designates one sample period.

The Mux Out logic states shown in FIG. 3 are the logic states idicative of an alternating signal at the burst signal frequency. Regardless of whether or not one or two of the relatively positive samples per cycle exceed Ref 1 or one or two of the relatively negative samples per cycle are less than Ref 2, the output from the multiplexer 36 will exhibit the pattern shown in FIG. 3.

The output signals from multiplexer 36 are applied to a tapped delay line 40 clocked synchronously with the sampling clock. Delay line 40 includes a plurality, N, of cascade connected delay elements, each of which provides a one-sample-period delay. An output tap is provided at every second stage. Each of the output taps and the output terminal of multiplexer 36 are coupled to respective input terminals of $(N/2+1)$-input AND gate 46. AND gate 46 produces a logic high output signal when each of its input terminals has a logic high level concurrently applied. This occurs when a signal pattern such as the Mux Out pattern of FIG. 3 is a loaded in the tapped delay line by multiplexer 36.

Delay line 40 and AND gate 46 operate as a correlator in conjunction with multiplexer 36 to detect the occurrence of the burst signal. The illustrated example detects burst on the occurrence of two burst cycles. Delay line 40 may have additional delay stages and output taps added if it is desired to detect burst on the occurrence of a greater number of burst cycles.

AND gate 46 produces a logic high output if every other one of nine samples from multiplexer 36 is a logic high regardless of the logic state of the alternate samples. To precisely detect an alternating one-zero output pattern from multiplexer 36, additional output taps may be coupled to the alternate delay stages. These additional output taps would then be connected to e.g. inverting input terminals added to AND gate 46.

The output terminal of AND gate 46 is coupled via AND gate 58 to the clock, C, input terminal of latch 48. The Q output terminal of latch 48 provides the burst gate pulse and is normally in the low output state. A logic high applied by AND gate 46 "sets" latch 48 causing its Q output to go high. The Q output of latch 48 is coupled to the clock input terminal of counter 52 via AND gate 50. A $4f_{sc}$ clocking signal is connected to a second input terminal of AND gate 50. The output terminal of counter 52 is coupled via OR gate 54 to a reset terminal of latch 48.

when the Q output signal from latch 48 goes high, AND gate 50 is enabled to couple the $4f_{sc}$ clock signal to counter 52. Counter 52 counts clock pulses and produces an output signal at terminal 0, after the occurrence of a predetermined number of such pulses. The output signal from counter 52 resets latch 48 extinguishing the burst gate pulse. For example, if counter 52 is a binary divide-by-32 circuit, its output will change state after 16 clock pulses. There are four $4f_{sc}$ clock pulses per burst cycle, thus, the burst gate pulse will be four burst signal cycles wide.

In an alternate arrangement the output terminal of multiplexer 36 may be coupled to AND gate 50 instead of the $4f_{sc}$ clock. In this instance the counter 52 will be arranged to count a preset number of actual burst cycles.

Latch 56 and AND gate 58 are included to preclude the generation of more than one pulse from latch 48 per line interval. Latch 56 is set by the horizontal sync pulse and enables AND gate 58 to apply output signal from AND gate 46 to latch 48. The output terminal of AND gate 58 is also coupled to the reset terminal of latch 56.

The first high logic signal passed by AND gate 58 from AND gate 46 simultaneously sets latch 48 and resets latch 56. Latch 56 then disables AND gate 58 until the next horizontal sync pulse.

It it is desired to initiate the burst gate pulse on the same cycle of burst from line-to-line, multiplexer 36 must be set in alternate states from line-to-line to account for the 180 degree phase relationship of the burst signal. This is accomplished by "setting" latch 38 on every other line by a clock signal Hsync/2. Assume that if latch 38 is in the set state, pulses from element 34 are passed by multiplexer 36. The first pulse through multiplexer 36 will correspond to a negative excursion of burst. Therefore, on every other line, the system is conditioned such that the first pulse detected is for a negative burst cycle. Next consider the alternate lines where the latch 38 is not set by the clock signal Hsync/2. If the last video sample on the preceding line detected by elements 32 and 34 conditioned multiplexer 36 to pass signal from element 32, this condition will continue into the next line. Alternatively, if the last video sample on the preceding line conditioned multiplexer 36 to pass signal from element 34, then when the horizontal sync pulse of composite video occurs on terminal 30, element 34 will detect it causing the latch 38 and multiplexer 36 to change state. Immediately after the horizontal sync pulse the multiplexer will be conditioned to pass signal from element 32.

To summarize, on alternate lines clock Hsync/2 conditions multiplexer 36 to pass signal from element 34. On intervening lines the nature of the composite video signal conditions multiplexer 36 to pass signal from element 32. Therefore, the system will initiate the generated burst gate pulse on the same cycle of the burst signal from line-to-line.

Next, consider a noise spike occurring between the horizontal sync pulse and burst which is of sufficient amplitude to trigger element 32 or 34. If the noise sample causes multiplexer 36 to undesirably change state, the position of the burst gate will be displaced by one-half cycle of burst. This condition is precluded by AND gate 44. Once the burst signal is being detected, multiplexer 36 produces a one state at every second sample period. AND gate 44, coupled to the output of multiplexer 36 and second stage of delay line 40, detects the occurrence of a "one" state follwed by a zero state two samples later, indicating that the first "one" state was not generated by burst. The output of AND gate 44 is coupled to the clock input of latch 38 to condition latch 38 to return to the state in which it was prior to the occurrence of the noise spike. If desired, the output of AND gate 44 may also be coupled back to the second delay stage of delay line 40 to reset that stage to a zero value.

Finally, at the beginning of each horizontal line, counter 52 and latch 48 are reset by the horizontal sync signal Hsync. If desired, all of the delay stages may also be reset to zero by the horizontal sync pulse.

Figure 4:
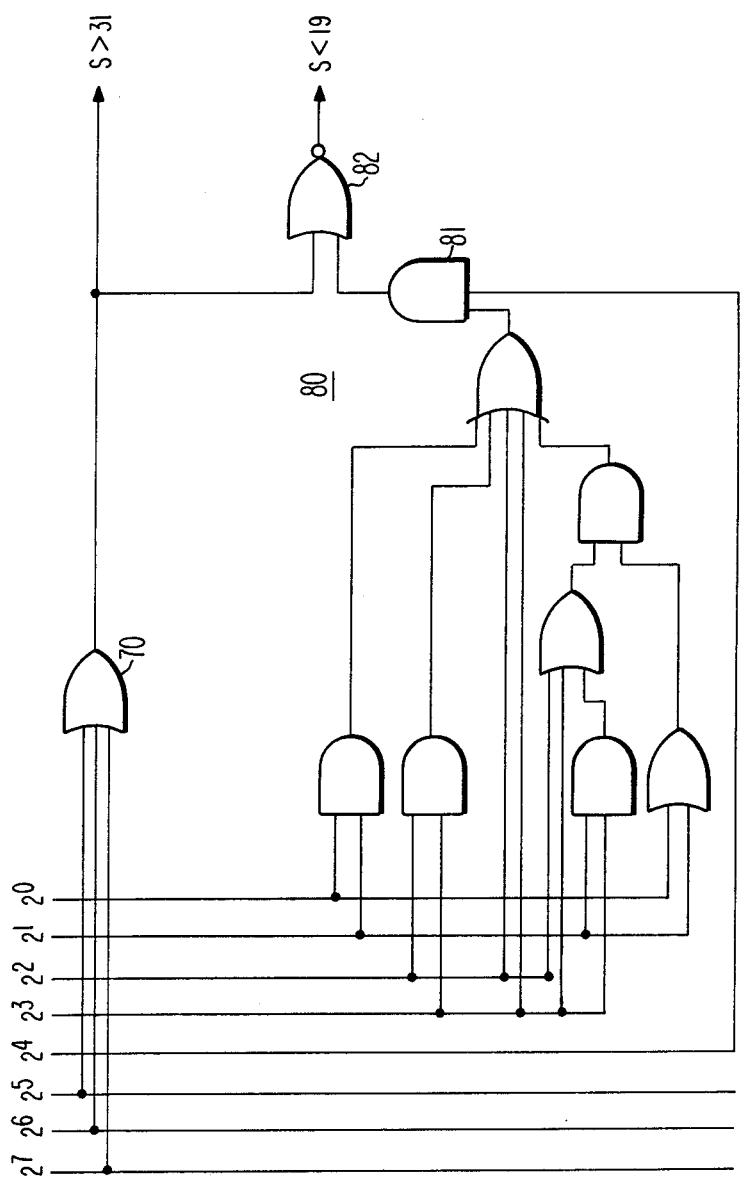
FIG. 4 is a logic schematic diagram of a digital window comparator which may be used in the FIG. 1 and FIG. 2 circuits.

FIG. 4 illustrates exemplary circuitry which may be substituted for elements 32 and 34 of FIG. 2. In the design of the FIG. 4 circuitry the following assumptions are made. First, the samples are eight bit binary samples having a range of values from zero to 256. The ADC 16 is biased to linearly process a video signal of 160 IRE. Therefore, one binary unit corresponds to 0.63 IRE. The mean value of burst, i.e. the back porch of horizontal sync, is clamped at 40 IRE (binary 25). Threshold values Ref 1 and Ref 2 are established at 50 IRE (binary 31) and 30 IRE (binary 19) respectively, i.e. 40 IRE +10 IRE. The required circuitry to perform the element 32 function must detect all binary sample values greater than binary 31. The required circuitry to perform the element 34 function must detect all binary sample values less than binary 19.

In FIG. 4 the input sample bit lines are labeled $2^0$–$2^7$. A logic high on bit lines $2^5$, $2^6$ and $2^7$ respectively indicate sample values of 32, 64 and 128. For any sample value equal to or greater than 32 one of these bit lines must be high. Thus, ORing bit lines $2^5$ $2^6$ and $2^7$ in OR gate 70 will indicate when the sample is greater than 31. OR gate 70, therefore, corresponds to detector element 32.

Circuitry 80 can be shown to generate a logic high for all sample values less than 19. AND gate 81 ands bit lines $2^4$ (binary 16) with all combinations representing binary 3 to binary 15. Thus, AND gate 81 will output a logic high for samples having values between binary 19 and 31. The output of AND gate 81 and the output of OR gate 70 are applied to NOR gate 82. NOR gate 82 will produce an output only if both its inputs are low, i.e. if the sample value is not binary 32 or greater and the sample value is not between 19 and 31. Thus, NOR gate 82 will generate a logic high only if the sample value is less than 19.

Note it may be necessary to include incremental delays between particular ones of the logic elements to prevent race conditions. However, those skilled in the art of digital circuit design will readily recognize this possibility and include such delays where appropriate. For example, the delay element 43 coupling the multiplexer output terminal to the clock input terminal of latch 38 in FIG. 2 is one such delay. For the operation of the FIG. 2 circuit as depicted by the waveforms of FIG. 3, this delay element is not a clocked delay but rather an RC type delay element.

What is claimed is:

1. Apparatus for generating a burst gate pulse from a composite video signal including a burst signal component and a horizontal synchronizing component, comprising:

a terminal for applying composite video signal;

signal detection means, coupled to said terminal, for generating a digital signal having a first state whenever the composite video signal occurs outside a predetermined range of values and a second state otherwise and wherein the mean value of the burst component resides within said predetermined range;

means coupled to said signal detection means and responsive to said digital signal for generating a control signal upon the occurrence of a predetermined number of occurrences of said digital signal being in said first state;

means, coupled to said control signal generating means, and responsive to said control signal for generating a pulse output signal corresponding to said burst gate pulse, said pulse output signal having a predetermined duration; and means coupled to said terminal and responsive to said horizontal synchronizing component for conditioning the combination of said control signal generating means and said pulse generating means to produce said pulse output signal for the first occurrence of said predetermined number of occurrences of said digital signal being in said first state after the occurrence of said horizontal synchronizing component.

2. The apparatus set forth in claim 1 wherein said signal detection means comprises:
   a first threshold detector coupled to said terminal, for producing at an output terminal thereof, a signal having said first output state for applied signal values exceeding a first reference value, and said second state otherwise;
   a second threshold detector coupled to said terminal, for producing at an output terminal thereof, a signal having said first output state for applied signal values being less than a second reference value, and having said second state otherwise; and
   means for combining signals from said first and second threshold detectors.

3. The apparatus set forth in claim 2 wherein the means for combining signals comprises:
   a multiplexer having first and second signal input terminals coupled to the respective output terminals of said first and second threshold detectors, and having an output terminal; and
   logic circuitry coupled to the output terminal of said multiplexer for conditioning the multiplexer to alternately pass to its output terminal, input signals having said first output state from said first and second threshold detectors.

4. The apparatus set forth in claim 3 wherein said means for generating said control signal comprises a correlator.

5. The apparatus set forth in claim 3 wherein said logic circuitry includes means for conditioning said multiplexer to couple said first threshold detector to its output terminal to pass first state initially therefrom on alternate video lines and to couple said second threshold detector to its output terminal to pass a first state initially therefrom on intervening video lines.

6. The apparatus set forth in claim 1 wherein said means for generating said control signal comprises a correlator.

7. The apparatus set forth in claim 6 wherein said correlator comprises:
   a plurality of cascade connected signal delay elements, ones of which have output taps and the first delay element having an input terminal coupled to said signal detection means;
   logic circuitry coupled to said output taps of generating said control signal when signal values concurrently occurring at said output taps have a particular pattern of said first and second states.

8. The apparatus set forth in claim 7 wherein the means for generating a pulse output signal comprises:
   a clock signal generator for providing a clock signal synchronous with said burst signal component;
   counter circuitry having a clock input terminal and having an output terminal, wherein said counter circuitry generates a pulse output signal having a duration equal to a predetermined number of clock pulses applied to its clock input terminal; and
   means responsive to said control signal for enabling said counter circuitry to count clock signal pulses from said clock signal generator.

9. The apparatus set forth in claim 1 wherein the means for generating a pulse output signal comprises:
   a clock signal generator for providing a clock signal synchronous with said burst signal component;
   counter circuitry having a clock input terminal and having an output terminal, wherein said counter circuitry generates a pulse output signal having a duration equal to a predetermined number of clock pulses applied to its clock input terminal; and
   means responsive to said control signal for enabling said counter circuit to count clock signal pulses from said clock signal generator.

10. Apparatus for generating a burst gate pulse from a composite video signal having a burst signal component, comprising:
    a terminal for applying said video signal;
    means coupled to said terminal for producing a control signal upon detecting a predetermined number of the firstmost cycles of said burst signal component; and
    means responsive to said control signal for generating said burst gate pulse having a pulse width equal to a predetermined number of burst signal cycle periods.

11. The apparatus set forth in claim 10 wherein the means for generating a pulse output signal comprises:
    a clock signal generator for providing a clock signal synchronous with said burst signal component;
    counter circuitry having a clock input terminal and having an output terminal, wherein said counter circuitry generates a pulse output signal having a duration equal to a predetermined number of clock pulses applied to its clock input terminal; and
    means responsive to said control signal for enabling said counter circuitry to count clock signal pulses from said clock signal generator.

12. The apparatus set forth in claim 10 wherein the means for generating said control signal comprises:
    a window comparator having first and second threshold values centered about the mean value of the burst signal, said first and second threshold values established to intercept relatively positive and negative going excursions of said burst signal, said window comparator generating a bilevel output signal exhibiting a first state for said burst signal amplitude being greater and lesser than said first and second threshold values respectively and exhibiting a second state for said burst signal amplitude lying between said first and second threshold values; and
    means responsive to said bilevel signal for detecting a predetermined sequence of signal states of said bilevel signal and generating said control signal upon detection of such sequence.

13. The apparatus set forth in claim 12 wherein the means for detecting a predetermined sequence comprises:
    a plurality of cascade connected signal delay elements coupled to receive said bilevel signal, ones of said delay elements having output taps;
    logic circuitry coupled to said output taps for generating said control signal when signal values concurrently occurring at said output taps having a predetermined pattern of said first and second states.

14. The apparatus set forth in claim 13 wherein the logic circuitry includes an AND gate having respective intput terminals coupled to said respective ones of said output taps, and having an output terminal at which said control signal is produced.

15. The apparatus set forth in claim 12 wherein said window comparator includes means for conditioning said window comparator to initially detect a positive going excursion of said burst signal on alternative vdieo lines and to initially detect a negative going excursion of said burst signal on intervening video lines.

* * * * *